No. 700,655. Patented May 20, 1902.
E. KEMPSHALL.
MANUFACTURE OF GOLF BALLS.
(Application filed Nov. 16, 1901.)

(No Model.)

Witnesses
Robert Head
R. W. Pittman

Inventor
Eleazer Kempshall
By his Attorney
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

MANUFACTURE OF GOLF-BALLS.

SPECIFICATION forming part of Letters Patent No. 700,655, dated May 20, 1902.

Application filed November 16, 1901. Serial No. 82,500. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Golf-Balls, of which the following is a specification.

This invention relates to balls such as used in golf and certain other games; and its objects are to improve the quality, efficiency, and stanchness of the balls and also to improve the method of producing them.

According to my present improvements I provide the relatively soft material of the core with a jacket, preferably by winding twine layer over layer around the same, the ball thus preliminarily formed being preferably oversize, and then I place the shell-segments over such ball and subject the whole to compression, simultaneously heating the shell, so as to enable it to more readily contract to its finished size under the action of the dies. The jacket prevents the soft material of the core from flowing out through the crevice between the edges of the shell as they approach each other. The presence of the jacket in the finished ball confers advantages, which will be hereinafter explained.

Figure 1:
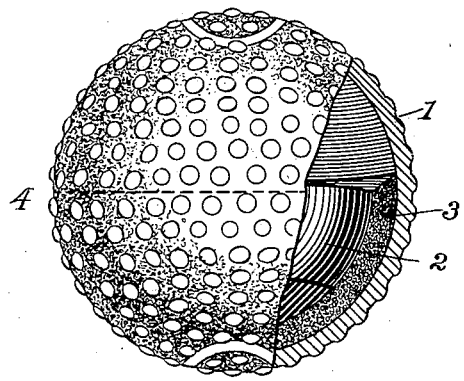
Figure 2:
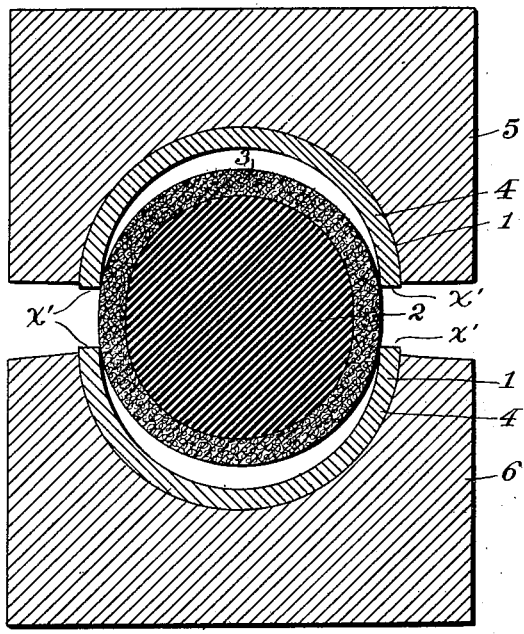

In the accompanying drawings, Figure 1 is a view, partly broken away, of the ball made according to my present improvements; and Fig. 2 illustrates the preferred method of joining the shell to the core.

Similar characters of reference designate like parts in both figures.

The shell (designated as 1) consists of a relatively hard but springy material, such as celluloid or hard rubber, while the core or filling comprises a relatively soft substance 2, which is elastic in all directions. For this core I employ any suitable material, such as rubber of suitable consistency, but preferably gutta-percha or one of its substitutes.

I first inclose the core in a more or less tough jacket or coat, which preferably consists of one or more layers of fibrous material. In this instance I make said jacket by winding twine 3 repeatedly around the same, so as to form a ball, the windings passing over and over and forming a closely-compacted coat. I prefer to employ linen twine of relatively hard twist; but in some cases other kinds of twine, cord, or the like may be used. In its original shape the nucleus comprising the core and the jacket thereon is substantially round, although it may depart from the spherical form within the scope of the invention; but I prefer that its bulk shall be a little too large for the final capacity of the shell.

The shell I preferably form in two semispherical segments 4, between which the nucleus is placed. The parts thus assembled are placed between forming-dies—as, for instance, 5 and 6—whereupon the latter are pressed together by means of suitable mechanism, thus forcing the shells together so as to bring their edges into intimate contact. To said edges cement is previously applied, so that when they are forced together they adhere, although the invention is not limited to this particular method of effecting adhesion. When required, the dies may be heated by steam or otherwise for bringing the material of the shell-segments into suitable condition and consistency, both for uniting them and also for facilitating the compressing and shaping action of the dies. When celluloid is employed, the heating of the dies effects a softening of the shell, so that it may be more readily pressed from its original to its finished or final size, and the dies may be then allowed to cool before the balls are taken out, so as to give the shells an opportunity to reharden, whereby they are enabled to retain their shape when removed. The abutting edges of the original segments at $1^\times$ may be made somewhat full, thereby to furnish material for properly forming the joint between them as they are subjected to the final compression.

It will be understood that the material of the shell is compressed between the dies and the resisting mass of the nucleus contained therein, and since said nucleus is first prepared somewhat oversize the resistance thereof while under such compression furnishes a substantial support for sustaining the relatively thin shell against the pressure of the forming-dies. By properly proportioning the size of the nucleus the shells when being finished may be sustained against any necessary degree of pressure of the dies.

For a golf-ball the shell is preferably made of celluloid, which is stiff and springy, and hence well adapted for use in this game, while the core is preferably made of gutta-percha. The object of such a combination is to produce a twofold springiness in the ball or, in other words, to enable the elasticity of the core to coöperate with the springiness of the shell, so as to instantly restore the latter to its normal shape after distortion by a blow, and thus to enhance the resiliency of the ball as a whole. The elasticity of the core, and hence its promptness in recovering from the blow, is greatly enhanced by having it constantly under compression, since the outward pressure thereof in all directions tends constantly to assume and maintain a spherical shape, or, in other words, an outward pressure, such as caused by compression, is of material assistance in enabling the ball to spring instantly back to its original shape, and hence to rebound when thrown against an object, as well as to fly with greater speed and to cover a greater distance when struck by an implement. It will be seen that one of the important features of the ball resides in causing the springiness of the shell and elasticity of the core to coöperate in producing a ball of greatly-increased efficiency. The tendency of the nucleus or core when subjected to pressure at the welding operation is to squeeze out between the approaching edges of the shell. This tendency is overcome by the provision of the tough jacket. It is not essential, however, that the latter be produced in all cases by winding cord or fabric around the nucleus.

From the foregoing it will be seen that the finished ball comprises a relatively soft elastic core, a relatively hard springy shell, and an intermediate layer of material which has the property of being tough, but is not necessarily hard nor resilient. This layer forms a reinforcement for the shell itself and is of great value, since when the ball is given a knock the force thereof is diffused, and hence the ball is generally altered from its true spherical shape, whereby the elasticity of the core acts over a large area with greatly-increased effectiveness, so that the ball much more readily assumes its normal shape and is thus more lively and efficient. It will be understood that when the ball is given a sharp knock with a corner or small end of an implement the normal tendency of the shell, especially when the latter is made of celluloid and has thin walls, as illustrated in the drawings, is to dent in sharply, thus affecting only the part of the core which is right behind the area of impact and compacting only a small portion of the core without tending generally to alter the entire conformation thereof, so that only this small portion of the core would be materially effective in returning the shell to its original shape, whereas by placing a jacket of a suitable toughness over the core and behind the shell the sharp indentation of the latter is prevented, since if the jacket is pushed inwardly anywhere a large area thereof is necessarily affected and dragged inwardly to a slight extent, so that instead of a deep indentation being produced in the nucleus over a small area the latter is slightly flattened over a large area, and thereby the entire shape of the core, as well as the shell, is a little distorted, and in consequence the whole energy of the core is called upon, and the ball is restored instantly to its normal position. Moreover, by employing said intermediate fibrous layer or backing for the shell the liability of cracking of the latter is practically eliminated, particularly since the presence of such backing prevents undue indentation of the shell, as just explained. The shell may be otherwise reinforced, and both the shell and the reinforcement may be made of varying thickness and of other materials within the scope of the invention, and various efforts produced by different combinations of shell, reinforcement, and core may be produced within the scope of the invention. Preferably the twine is made of linen of relatively hard twist and passed over and over the core to form a closely-compact coat of material thickness, so as to more readily transmit and spread the force of the blow and distribute said force over a large area of the compressible elastic core. It will be understood that the presence of said jacket does not defeat the tendency of the compressed core to preserve the spherical shape of the shell, since said jacket is not as rigid as the shell itself, and although it is wound compactly over the core still it becomes relaxed to a slight extent, so far as the longitudinal tension of the twine or the like is concerned, when the shells are compressed thereover.

Having described my invention, I claim—

1. A process in producing a playing-ball, consisting in applying a jacket of fibrous material to a core of solid material, inclosing said jacket and core in segments of plastic material, heating and forcing said segments together so as to form a weld between them, and maintaining the impression while the shell cools and hardens.

2. A process in producing a playing-ball, consisting in winding twine or the like around a solid nucleus or core of elastic material, making a shell in segments of plastic material which approximate their final form, heating said segments and compressing them upon said wound nucleus or core so as to weld said segments together, and maintaining the compression while the welded segments cool and harden.

3. A process in producing a playing-ball, consisting in winding several layers of twine or the like around a core consisting of gutta-percha, heating celluloid segments and forcing them together over said wound core so as to cause them to weld and also to place said core under compression, and maintaining the compression of the shell upon the core while the shell cools and hardens.

4. A process in producing a playing-ball, consisting of making a core consisting largely or wholly of gutta-percha, providing the same with a retaining-jacket of fibrous material, making celluloid segments, heating said segments, forcing them over said jacketed core, welding them together, compressing the core, and maintaining the compression until the shell hardens.

ELEAZER KEMPSHALL.

Witnesses:
FRED. J. DOLE,
B. C. STICKNEY.